(12) United States Patent
Dong et al.

(10) Patent No.: US 11,519,319 B2
(45) Date of Patent: Dec. 6, 2022

(54) ELECTROMAGNETIC SILICONE OIL WATER PUMP CLUTCH AND WORKING METHOD THEREOF

(71) Applicant: JIANGSU RISING UNITED AUTO TECHNOLOGY GROUP LTD., Taicang Suzhou (CN)

(72) Inventors: Mingjiang Dong, Taicang Suzhou (CN); Dajin Gong, Taicang Suzhou (CN); Dunlv Liu, Taicang Suzhou (CN); Haifeng Wu, Taicang Suzhou (CN)

(73) Assignee: JIANGSU RISING UNITED AUTO TECHNOLOGY GROUP LTD., Taicang Suzhou (CN)

( * ) Notice: Subject to any disclaimer, the term of this patent is extended or adjusted under 35 U.S.C. 154(b) by 0 days.

(21) Appl. No.: 17/598,911

(22) PCT Filed: Jun. 24, 2019

(86) PCT No.: PCT/CN2019/092469
§ 371 (c)(1),
(2) Date: Sep. 28, 2021

(87) PCT Pub. No.: WO2020/199374
PCT Pub. Date: Oct. 8, 2020

(65) Prior Publication Data
US 2022/0162980 A1    May 26, 2022

(30) Foreign Application Priority Data

Apr. 2, 2019  (CN) .......................... 201910259193.5
Apr. 2, 2019  (CN) .......................... 201920432640.8

(51) Int. Cl.
*F01P 5/10*   (2006.01)
*F01P 7/16*   (2006.01)
*F01P 5/12*   (2006.01)

(52) U.S. Cl.
CPC ................. *F01P 7/162* (2013.01); *F01P 5/12* (2013.01)

(58) Field of Classification Search
CPC .... F01P 7/162; F01P 5/12; F01P 7/042; F01P 7/081; F01P 7/082

(Continued)

(56) References Cited

U.S. PATENT DOCUMENTS 4,757,888 A * 7/1988 Nakajima ............. F16D 27/112
                                                192/30 W
5,743,467 A * 4/1998 Ban ........................ B60H 1/038
                                                    122/26

(Continued)

FOREIGN PATENT DOCUMENTS

CN       2338493 Y  *  9/1999  ................ F01P 7/08
CN     201568316 U  *  9/2010  ............. F04D 13/02

(Continued)

*Primary Examiner* — Hung Q Nguyen
*Assistant Examiner* — Anthony Donald Taylor, Jr.
(74) *Attorney, Agent, or Firm* — PROI Intellectual Property US; Klaus Michael Schmid

(57) ABSTRACT

An electromagnetic silicone oil water pump clutch, comprising: a water pump body, a pump shaft, an electromagnetic solenoid coil, a belt pulley, a coupling shaft sleeve, a driven disc, a spring piece, a coupling disc, a driving disc, and a silicone oil cavity shell. The pump shaft is provided at the center of the water pump body; a fixing plate is provided at one end of the water pump body; the electromagnetic solenoid coil is provided on the fixing plate; the belt pulley is provided on the water pump body; the silicone oil cavity shell is pressed and riveted on one side of the belt pulley; the coupling shaft sleeve is fixed to one end of the pump shaft;

(Continued)

the spring piece is provided on the outer side of the coupling shaft sleeve; the coupling disc is provided on the spring piece.

6 Claims, 1 Drawing Sheet

(58) Field of Classification Search
USPC .................................................. 123/41.44
See application file for complete search history.

(56) References Cited

U.S. PATENT DOCUMENTS

| | | | | |
|---|---|---|---|---|
| 5,947,107 | A * | 9/1999 | Ban | F24V 40/00 122/26 |
| 7,025,187 | B2 * | 4/2006 | Hammond | F16D 27/112 192/84.961 |
| 8,186,494 | B2 * | 5/2012 | Boyer | F16D 48/06 192/113.24 |
| 2006/0137956 | A1 * | 6/2006 | Boffeli | F01P 7/048 192/48.2 |
| 2008/0023288 | A1 * | 1/2008 | Boyer | F16D 35/024 192/58.61 |
| 2008/0023289 | A1 * | 1/2008 | Boyer | F16D 35/024 192/58.61 |
| 2008/0023290 | A1 * | 1/2008 | Boyer | F16D 35/024 192/58.61 |
| 2011/0236231 | A1 * | 9/2011 | Ikegawa | F16D 27/102 417/316 |
| 2012/0111688 | A1 * | 5/2012 | Komai | F16D 27/102 192/74 |
| 2012/0202631 | A1 * | 8/2012 | Schmitz | B60K 25/02 474/148 |
| 2014/0174874 | A1 * | 6/2014 | Qin | F16D 27/112 192/66.32 |
| 2015/0041277 | A1 * | 2/2015 | Boyes | B60K 25/02 192/80 |
| 2016/0017894 | A1 * | 1/2016 | Qin | F01P 3/20 417/374 |
| 2016/0040733 | A1 * | 2/2016 | Staniewicz | F16D 27/025 701/67 |
| 2016/0169235 | A1 * | 6/2016 | Ignatovich | F16D 35/024 415/122.1 |
| 2018/0180115 | A1 * | 6/2018 | Iha | F16D 27/112 |

FOREIGN PATENT DOCUMENTS

| | | | | |
|---|---|---|---|---|
| CN | 202039934 | U * | 11/2011 | F01P 7/16 |
| CN | 104454486 | A * | 3/2015 | F01P 7/16 |
| CN | 207349127 | U * | 5/2018 | F01P 5/12 |
| DE | 102014223327 | A1 * | 6/2015 | F01P 5/04 |
| WO | WO2017107967 | A1 * | 6/2017 | F01P 5/12 |

* cited by examiner

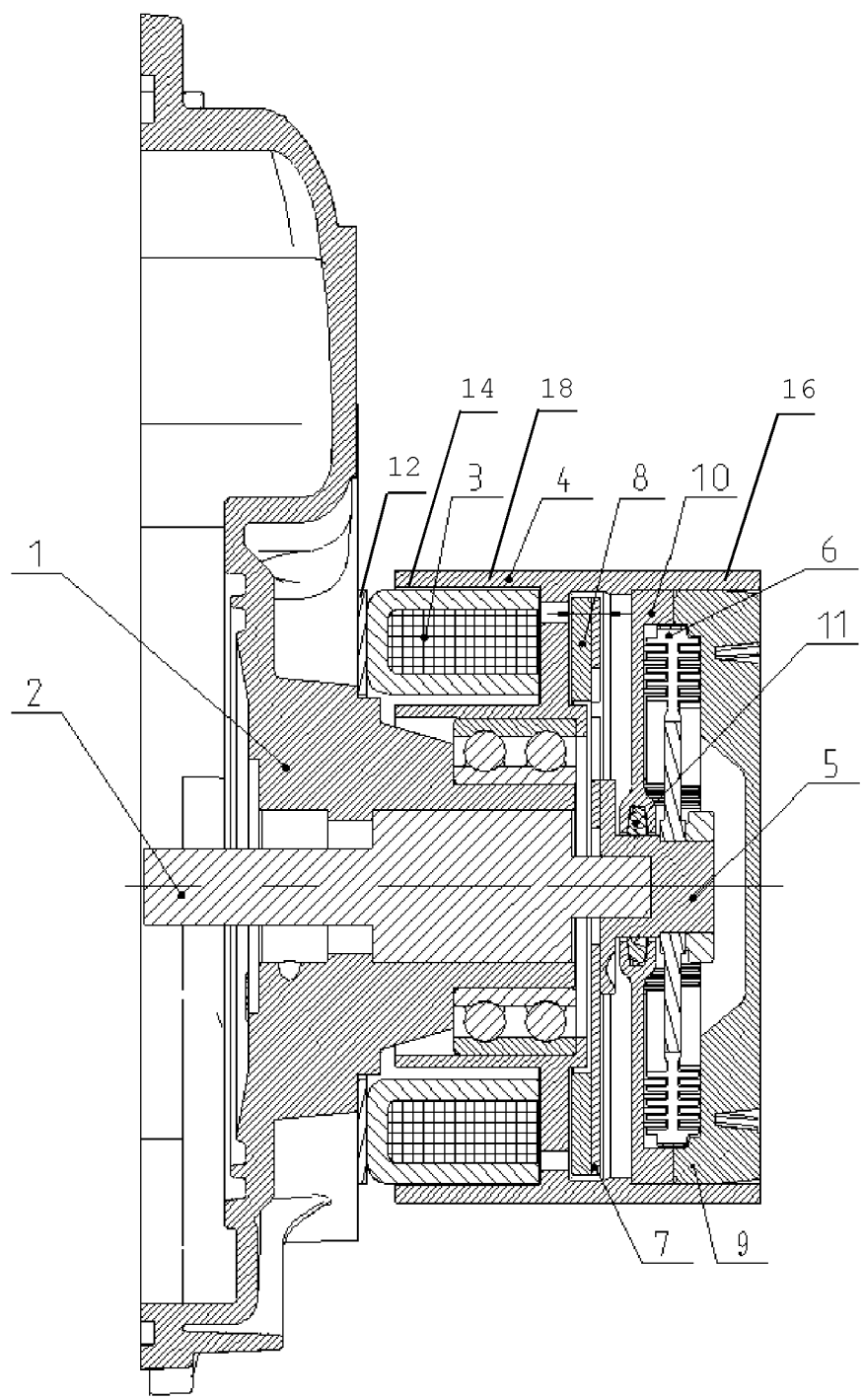

ELECTROMAGNETIC SILICONE OIL WATER PUMP CLUTCH AND WORKING METHOD THEREOF

TECHNICAL FIELD

The present disclosure belongs to the field of automobile engine cooling systems, and in particular relates to an electromagnetic silicone oil water pump clutch for controlling engine coolant flow and a working method thereof.

BACKGROUND

With the shortage of oil resources and the increasing environmental pollution, countries around the world begin to tighten the standards of automobile fuel consumption and emission. Therefore, more energy-saving and environment-friendly vehicles begin to be favored by people. If an internal combustion engine with a history of more than 100 years wants to keep its vigorous vitality, it must make a breakthrough in energy saving and emission reduction technology.

The automobile cooling system is very important to the automobile, and the engine is just like the human heart, which will be threatened if it is not well protected. In the past, only the traditional single-speed cooling water pump was used to drive the coolant to circulate. In the future development of automobiles, the single-speed cooling water pump will not stand in the leading position. The flexible and variable cooling system control will be used as a standard device in automobiles, which will prolong the service life of engines, improve the overall performance of engines, and save energy and reduce emissions. In order to solve the flow speed of coolant in different working conditions of engines, the present disclosure adds a variable speed water pump clutch on the basis of the traditional direct water pump, and different cooling water flow rates are provided for the engine through the water pump clutch under different working conditions of the engine, so that the engine timely adjusts the engine temperature under different working conditions.

The traditional engine cooling water pump mainly has the following problems.

1. At present, the engine cooling water pump and the engine belt pulley rotate synchronously and only have a single speed.
2. The temperature of the engine cannot be timely adjusted according to different working conditions of the engine.
3. The traditional engine cooling water pump cannot achieve the purpose of saving energy and reducing emissions and prolonging the service life of the engine because the rotation speed of the pump shaft is fixed.

SUMMARY

Purpose of the present disclosure: in order to overcome the above shortcomings, the purpose of the present disclosure is to provide an electromagnetic silicone oil water pump clutch, which provides an adjustable rotating speed for the water pump by means of the electromagnetic solenoid coil and silicone oil viscous force. The present disclosure is high in adjustment precision and strong in practicability. The present disclosure provides more rotational speed choices for the engine cooling water pump.

Technical scheme: In order to achieve the above purpose, the present disclosure provides an electromagnetic silicone oil water pump clutch, comprising: a water pump body, a pump shaft, an electromagnetic solenoid coil, a belt pulley, a coupling shaft sleeve, a driven disc, a spring piece, a coupling disc, a driving disc, and a silicone oil cavity shell, wherein the pump shaft is provided at the center of the water pump body, a fixing plate is provided at one end of the water pump body, the electromagnetic solenoid coil is provided on the fixing plate, the belt pulley is provided on the water pump body, the belt pulley is connected with the water pump body through a bearing, the belt pulley is provide with a groove, the electromagnetic solenoid coil extends into the groove of the belt pulley, the silicone oil cavity shell is pressed and riveted on one side of the belt pulley, silicone oil is provided in the silicone oil cavity shell, the coupling shaft sleeve is fixed to one end of the pump shaft, the spring piece is provided on the outer side of the coupling shaft sleeve, the coupling disc is provided on the spring piece, the coupling shaft sleeve is provided on the silicone oil cavity shell, the driven disc is provided in the silicone oil cavity shell, the center of the driven disc is fixed on the coupling shaft sleeve, the driving disc is provided on one side of the driven disc far away from the pump shaft, and the driving disc is fixed to the inner side of the belt pulley.

Silicone oil is provided in the silicone oil cavity shell, and the silicone oil carries out friction torque transmission in the silicone oil cavity.

According to the clutch provided by the present disclosure, two transmission modes, namely electromagnetic coupling and silicone oil viscous force coupling, are provided to provide a variable rotating speed for the water pump, so that the coolant flow of the water pump is variable, and the engine temperature is changed in the case of the variable coolant.

A Z-shaped sealing ring is provided on the silicone oil cavity shell, and the silicone oil cavity shell is sealed by the Z-shaped sealing ring.

A sealing ring is provided inside the silicone oil cavity shell, and the sealing ring is matched with the coupling shaft sleeve for sealing.

The sealing ring is provided in the present disclosure, which can avoid the leakage of silicone oil with strong practicability.

The driving disc is riveted with the belt pulley by pressure, and the driving disc and the silicone oil cavity shell form a silicone oil viscous force cavity.

The driving disc and the belt pulley are provided in the present disclosure, which increases the connection strength between the belt pulley and the driving disc, reduces the possibility of stalling and has high safety.

The electromagnetic solenoid coil is connected with an automobile computer control module, and the automobile computer control module is essentially an automobile engine computer ECU.

The electromagnetic solenoid coil comprises an outer coil layer and an inner iron core, a magnetic conductive surface is provided on one side of the belt pulley close to the electromagnetic solenoid coil, and an air gap is left between the electromagnetic solenoid coil and the magnetic conductive surface of the belt pulley.

Silicone oil viscous force grooves are provided on both sides of the driven disc.

The silicone oil viscous force groove is provided in the present disclosure, which can increase the contact area between the driven disc and the silicone oil, improve the friction force between the driven disc and the silicone oil, and avoid the phenomenon that the rotating speed is too low.

The working method of the electromagnetic silicone oil water pump clutch according to the present disclosure comprises realizing high-speed water pump operation through electromagnetic magnetic coupling and realizing low-speed water pump operation through silicone oil viscous force transmission, wherein the working method specifically comprises the following steps:

step 1: the electromagnetic solenoid coil is electrified, the electromagnetic solenoid coil generates a magnetic force to adsorb a coupling disc, a belt pulley where the electromagnetic solenoid coil is located is rigidly connected with a pump shaft where the coupling disc is located, and the belt pulley drives the pump shaft to rotate at a high speed through the coupling disc;

step 2: the electromagnetic solenoid coil is not electrified, the electromagnetic solenoid coil is not coupled with the coupling disc, the driving disc riveted on the belt pulley drives the silicone oil in the silicone oil cavity shell to operate at a high speed, the silicone oil flows into the silicone oil viscous force grooves of the driving disc and the driven disc under the action of centrifugal force, the silicone oil drives the driven disc to move through its own viscosity, the driven disc follows the belt pulley to make follow-up rotation, and the driven disc drives the pump shaft to rotate; the step 1 and the step 2 are in no particular order.

The working method of the electromagnetic silicone oil water pump clutch is as follows: the water pump clutch has two-speed adjustment of "high speed" and "low speed"; "high speed" is rigidly connected with the belt pulley through the coupling disc under the action of electromagnetic force, so that the pump shaft and the belt pulley rotate at the same speed; the "low-speed" belt pulley drives the driven disc to operate at a low speed through the transmission of silicone oil viscous force, thus realizing the low-speed operation of the pump shaft. The rotating speed is regulated by silicone oil viscous force.

According to the present disclosure, the outer diameter of the silicone oil cavity is riveted with the belt pulley through pressure, and the driving disc, the silicone oil cavity shell and the belt pulley are fixedly connected.

According to the present disclosure, the electromagnetic solenoid coil is connected with the engine ECU through a wiring terminal.

According to the above technical scheme, the present disclosure has the following beneficial effects:

1. The electromagnetic silicone oil water pump clutch and the working method thereof in the present disclosure reduce the product cost using silicone oil viscous force transmission.

2. The electromagnetic silicone oil water pump clutch and the working method thereof in the present disclosure can effectively reduce the self-calorific value of the clutch by adopting silicone oil viscous force transmission and utilizing the high specific heat capacity and high heat dissipation capacity of silicone oil.

3. The electromagnetic silicone oil water pump clutch and the working method thereof in the present disclosure can effectively avoid the influence of environmental factors such as temperature, impact and vibration by utilizing the good energy absorption performance of silicone oil.

BRIEF DESCRIPTION OF THE DRAWINGS

FIG. 1 is a schematic diagram of the overall structure according to the present disclosure.

In the figures: water pump body—1, pump shaft—2, electromagnetic solenoid coil—3, belt pulley—4, coupling shaft sleeve—5, driven disc—6, spring piece—7, coupling disc—8, driving disc—9, silicone oil cavity shell—10, sealing ring—11.

DETAILED DESCRIPTION

The present disclosure will be further elucidated with reference to the drawings and specific embodiments.

Embodiment 1

An electromagnetic silicone oil water pump clutch comprises a water pump body 1, a pump shaft 2, an electromagnetic solenoid coil 3, a belt pulley 4, a coupling shaft sleeve 5, a driven disc 6, a spring piece 7, a coupling disc 8, a driving disc 9, and a silicone oil cavity shell 10, wherein the pump shaft 2 is provided at the center of the water pump body 1, a fixing plate is provided at one end of the water pump body 1, the electromagnetic solenoid coil 3 is provided on the fixing plate, the belt pulley 4 is provided on the water pump body 1, the belt pulley 4 is connected with the water pump body 1 through a bearing, the belt pulley 4 is provide with a groove, the electromagnetic solenoid coil 3 extends into the groove of the belt pulley 4, the silicone oil cavity shell 10 is pressed and riveted on one side of the belt pulley 4, silicone oil is provided in the silicone oil cavity shell 10, the coupling shaft sleeve 5 is fixed to one end of the pump shaft 2, the spring piece 7 is provided on the outer side of the coupling shaft sleeve 5, the coupling disc 8 is provided on the spring piece 7, the coupling shaft sleeve 5 is provided on the silicone oil cavity shell 10, the driven disc 6 is provided in the silicone oil cavity shell 10, the center of the driven disc 6 is fixed on the coupling shaft sleeve 5, the driving disc 9 is provided on one side of the driven disc 6 far away from the pump shaft 2, and the driving disc 9 is fixed to the inner side 16 of the belt pulley 4.

In this embodiment, a Z-shaped sealing ring is provided on the silicone oil cavity shell 10, and the silicone oil cavity shell 10 is sealed by the Z-shaped sealing ring.

In this embodiment, a sealing ring 11 is provided inside the silicone oil cavity shell 10, and the sealing ring 11 is matched with the coupling shaft sleeve 5 for sealing.

In this embodiment, the driving disc 9 is riveted with the belt pulley 4 by pressure, and the driving disc 9 and the silicone oil cavity shell 10 form a silicone oil viscous force cavity.

In this embodiment, the electromagnetic solenoid coil 3 is connected with an automobile computer control module, and the automobile computer control module is essentially an automobile engine computer ECU.

In this embodiment, the electromagnetic solenoid coil 3 comprises an outer coil layer and an inner iron core, a magnetic conductive surface 14 is provided on an outer side 18 of the belt pulley 4 close to the electromagnetic solenoid coil 3, and an air gap is left between the electromagnetic solenoid coil 3 and the magnetic conductive surface 14 of the belt pulley 4.

In this embodiment, silicone oil viscous force grooves are provided on both sides of the driven disc 6.

The working method of the electromagnetic silicone oil water pump clutch described in this embodiment comprises realizing high-speed water pump operation through electromagnetic magnetic coupling and realizing low-speed water pump operation through silicone oil viscous force transmission, wherein the working method specifically comprises the following steps:

step 1: the electromagnetic solenoid coil 3 is electrified, the electromagnetic solenoid coil 3 generates a magnetic force to adsorb a coupling disc 8, a belt pulley 4 where the electromagnetic solenoid coil 3 is located is rigidly connected with a pump shaft 2 where the coupling disc 8 is located, and the belt pulley 4 drives the pump shaft to rotate at a high speed through the coupling disc 8;

step 2: the electromagnetic solenoid coil 3 is not electrified, the electromagnetic solenoid coil 3 is not coupled with the coupling disc 8, the driving disc 9 riveted on the belt pulley 4 drives the silicone oil in the silicone oil cavity shell 10 to operate at a high speed, the silicone oil flows into the silicone oil viscous force grooves of the driving disc 9 and the driven disc 6 under the action of centrifugal force, the silicone oil drives the driven disk 6 to move through its own viscosity, the driven disc 6 follows the belt pulley 4 to make follow-up rotation, and the driven disc 6 drives the pump shaft to rotate.

The step 1 and the step 2 are in no particular order.

Embodiment 2

An electromagnetic silicone oil water pump clutch as shown in FIG. 1 comprises a water pump body 1, a pump shaft 2, an electromagnetic solenoid coil 3, a belt pulley 4, a coupling shaft sleeve 5, a driven disc 6, a spring piece 7, a coupling disc 8, a driving disc 9, and a silicone oil cavity shell 10, wherein the pump shaft 2 is provided at the center of the water pump body 1, a fixing plate 12 is provided at one end of the water pump body 1, the electromagnetic solenoid coil 3 is provided on the fixing plate 12, the belt pulley 4 is provided on the water pump body 1, the belt pulley 4 is connected with the water pump body 1 through a bearing, the belt pulley 4 is provide with a groove, the electromagnetic solenoid coil 3 extends into the groove of the belt pulley 4, the silicone oil cavity shell 10 is pressed and riveted on one side of the belt pulley 4, silicone oil is provided in the silicone oil cavity shell 10, the coupling shaft sleeve 5 is fixed to one end of the pump shaft 2, the spring piece 7 is provided on the outer side of the coupling shaft sleeve 5, the coupling disc 8 is provided on the spring piece 7, the coupling shaft sleeve 5 is provided on the silicone oil cavity shell 10, the driven disc 6 is provided in the silicone oil cavity shell 10, the center of the driven disc 6 is fixed on the coupling shaft sleeve 5, the driving disc 9 is provided on one side of the driven disc 6 far away from the pump shaft 2, and the driving disc 9 is fixed to the inner side 16 of the belt pulley 4.

The above is only the preferred embodiment of the present disclosure. It should be pointed out that for those skilled in the art, several improvements can be made without departing from the principle of the present disclosure, and these improvements should also be regarded as the protection scope of the present disclosure.

What is claimed is:

1. An electromagnetic silicone oil water pump clutch, comprising: a water pump body (1), a pump shaft (2), an electromagnetic solenoid coil (3), a belt pulley (4), a coupling shaft sleeve (5), a driven disc (6), a spring piece (7), a coupling disc (8), a driving disc (9), and a silicone oil cavity shell (10), wherein the pump shaft (2) is provided at a center of the water pump body (1), a fixing plate (12) is provided at an end of the water pump body (1), the electromagnetic solenoid coil (3) is provided on the fixing plate (12), the belt pulley (4) is provided on the water pump body (1), the belt pulley (4) is connected with the water pump body (1) through a bearing, the belt pulley (4) is provided with a groove, the electromagnetic solenoid coil (3) extends into the groove of the belt pulley (4), the silicone oil cavity shell (10) is pressed and riveted on an inner side (16) of the belt pulley (4), silicone oil is provided in the silicone oil cavity shell (10), the coupling shaft sleeve (5) is fixed to an end of the pump shaft (2), the spring piece (7) is provided on an outer side of the coupling shaft sleeve (5), the coupling disc (8) is provided on the spring piece (7), the coupling shaft sleeve (5) is axially on and defined within the silicone oil cavity shell (10), the driven disc (6) is provided in the silicone oil cavity shell (10), a center of the driven disc (6) is fixed on the coupling shaft sleeve (5), the driven disc (6) has two sides, wherein a first side of the two sides is closer to the pump shaft (2) than a second side of the two sides, the driving disc (9) is provided on said second side of the driven disc (6), and the driving disc (9) is fixed to the inner side (16) of the belt pulley (4) and against the silicone oil cavity shell (10).

2. The electromagnetic silicone oil water pump clutch according to claim 1, wherein a sealing ring (11) is provided inside the silicone oil cavity shell (10), and the sealing ring (11) is matched with the coupling shaft sleeve (5) for sealing.

3. The electromagnetic silicone oil water pump clutch according to claim 1, wherein the driving disc (9) is riveted with the belt pulley (4) by pressure, and the driving disc (9) and the silicone oil cavity shell (10) form a silicone oil viscous force cavity.

4. The electromagnetic silicone oil water pump clutch according to claim 1, wherein the electromagnetic solenoid coil (3) is connectable to an automobile electronic control module (ECM) or an automobile electronic control unit (ECU).

5. The electromagnetic silicone oil water pump clutch according to claim 4, wherein: the electromagnetic solenoid coil (3) comprises an outer coil layer and an inner iron core, a magnetic conductive surface (14) is provided on an outer side (18) of the belt pulley (4), said outer side (18) of the belt pulley (4) is closer to the electromagnetic solenoid coil (3) than said inner side (16) of the belt pulley (4), and an air gap is left between the electromagnetic solenoid coil (3) and the magnetic conductive surface (14) provided on the outer side (18) of the belt pulley (4).

6. The electromagnetic silicone oil water pump clutch according to claim 1, wherein silicone oil viscous force grooves are provided on both sides of the driven disc (6).

* * * * *